United States Patent
Lane et al.

(10) Patent No.: US 7,445,102 B2
(45) Date of Patent: Nov. 4, 2008

(54) AIR TURBINE STARTER ASSEMBLY

(75) Inventors: Glenn H. Lane, Chandler, AZ (US); Todd A. Langston, Chandler, AZ (US); Michael J. Burns, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 326 days.

(21) Appl. No.: 11/364,140

(22) Filed: Feb. 27, 2006

(65) Prior Publication Data

US 2007/0199785 A1 Aug. 30, 2007

(51) Int. Cl.
*F16D 13/74* (2006.01)
*F16D 41/12* (2006.01)
(52) U.S. Cl. .................. 192/42; 192/46; 192/69.1; 192/113.32
(58) Field of Classification Search ............. 192/69.1, 192/113.32
See application file for complete search history.

(56) References Cited

U.S. PATENT DOCUMENTS

| | | | |
|---|---|---|---|
| 2,284,362 A | 5/1942 | Birmann | |
| 3,004,495 A | 10/1961 | Macklis | |
| 3,049,081 A | 8/1962 | Singelmann | |
| 3,074,688 A | 1/1963 | De Muth et al. | |
| 3,180,268 A | 4/1965 | Willis et al. | |
| 3,318,644 A | 5/1967 | Johnson, III | |
| 3,474,888 A * | 10/1969 | Carlson et al. | 192/113.1 |
| 3,744,246 A | 7/1973 | Doerner | |
| 3,850,147 A | 11/1974 | Doerner | |
| 3,926,534 A | 12/1975 | Erickson | |
| 3,962,874 A | 6/1976 | Doerner | |
| 4,009,576 A | 3/1977 | Doerner et al. | |
| 4,073,596 A | 2/1978 | Erickson et al. | |
| 6,089,112 A * | 7/2000 | Kelly et al. | 192/46 |
| 6,580,179 B2 | 6/2003 | Eccles et al. | |
| 2005/0167227 A1* | 8/2005 | Langston | 192/46 |

FOREIGN PATENT DOCUMENTS

GB 832657 * 4/1960

* cited by examiner

*Primary Examiner*—Rodney H Bonck
(74) *Attorney, Agent, or Firm*—Ingrassia, Fisher & Lorenz, P.C.

(57) ABSTRACT

An aircraft engine starter assembly provides for liquid cooling of the clutch assembly and overrunning engine by integrating a pitot pump in the system. The system includes a starter motor, a torque transfer connection, a clutch assembly and the pitot pump. The torque transfer connection is adapted to be coupled to the aircraft engine. The clutch assembly is coupled to one of the starter motor or the torque transfer connection. The pitot pump is coupled to one or both of the torque transfer or the clutch assembly via a first oil line and a second oil line. The pitot pump comprises a pitot tube in fluidic communication with an oil reservoir for the delivery of oil under pressure to lubricate one or both of the torque transfer or the clutch assembly.

18 Claims, 3 Drawing Sheets

AIR TURBINE STARTER ASSEMBLY

TECHNICAL FIELD

The present invention generally relates to engine starters and, more particularly, to an air turbine driven starter assembly for aircraft engines that incorporates a pitot pump for lubricating rotating components of the air turbine.

BACKGROUND

It is known in the art to provide engine starters that employ over-run clutches or one-way torque transfer gear assemblies between the starter motor and the engine. The over-run clutch or other one-way drive assembly allows the starter motor to turn the engine when the engine is substantially stationary, and then automatically disengage when the engine starts to run on its own, turning faster than the starter motor. During operation, lubrication of the over-run clutch and other moving parts is typically accomplished by a pump that operates in conjunction with the starter. Currently, either a small centrifugal, gear, or g-rotor (gerotor) pump is used to supply lubricating oil to the overrunning section of the air turbine starter. While such pump systems are useful, they suffer from a number of disadvantages, especially when applied to air turbine starters for aircraft engines. Among these disadvantages are complexity, reliability, cost, and sensitivity to altitude. Accordingly there continues to be a need for an improved lubricating method and pump for use in an engine starter, especially for aircraft engines.

Accordingly, it is desirable to provide an improved aircraft engine starter assembly that incorporates a pump for providing a lubricating fluid to rotating components housed within the starter assembly, including a clutch system, bearings, seals and gears. In addition, it is desirable that the improved aircraft starter assembly incorporate a means for lubricating the rotating components of the system in which the lubricating means is not sensitive to altitude. Furthermore, other desirable features and characteristics of the present invention will become apparent from the subsequent detailed description and the appended claims, taken in conjunction with the accompanying drawings and the foregoing technical field and background.

BRIEF SUMMARY

An aircraft engine starter assembly has a torque transfer connection adapted to be coupled to the aircraft engine, a starter motor, a clutch assembly coupled to one of the starter motor or the torque transfer connection, and a pitot pump coupled to the overrunning section of the clutch assembly and delivering oil under pressure to lubricate one or both of the torque transfer or the clutch assembly. The pitot pump comprises a pitot tube in fluidic communication with a rotating oil reservoir.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
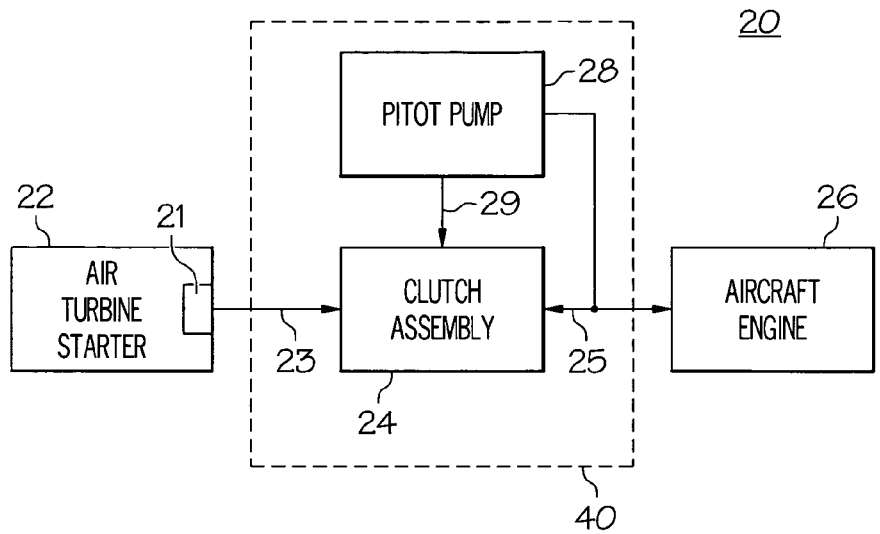
FIG. 1 is a simplified schematic block diagram of an air turbine starter assembly according to the present invention.

FIG. 1 is a simplified schematic block diagram of air turbine starter assembly 20 according to the present invention. Assembly 20 comprises air turbine starter motor 22, generally including reduction gear 21, a clutch assembly 24, an aircraft engine 26 and an internal pitot pump 28. When it is desired to start aircraft engine 26, air turbine starter motor 22 provides torque over a connection 23 to clutch assembly 24. Provided that a torque transfer connection 25 between clutch assembly 24 and aircraft engine 26 is stopped or turning slower than connection 23, clutch assembly 24 engages and transfers torque over torque transfer connection 25 to aircraft engine 26, causing it to turn. At the same time, the rotation of torque transfer connection 25 causes pitot pump 28 to pump oil 29 to clutch assembly 24, thereby preventing frictional damage.

As aircraft engine 26 begins to operate, the rotational speed of torque transfer connection 25 increases and gradually exceeds the rotational speed of connection 23. When this occurs, clutch assembly 24 automatically releases and acts as an over-running clutch allowing torque transfer connection 25 to rotate freely. Air turbine starter motor 22 and connection 23 can then stop, while an overrunning section remains operational. When aircraft engine 26 is running it supplies power over torque transfer connection 25 to turn a portion of clutch assembly 24 and drive pitot pump 28. As long as engine 26 and torque transfer connection 25 are turning, pitot pump 28 provides pressurized lube oil 29 so that clutch assembly 24 can operate with low friction in the over-run mode.

Figure 2:
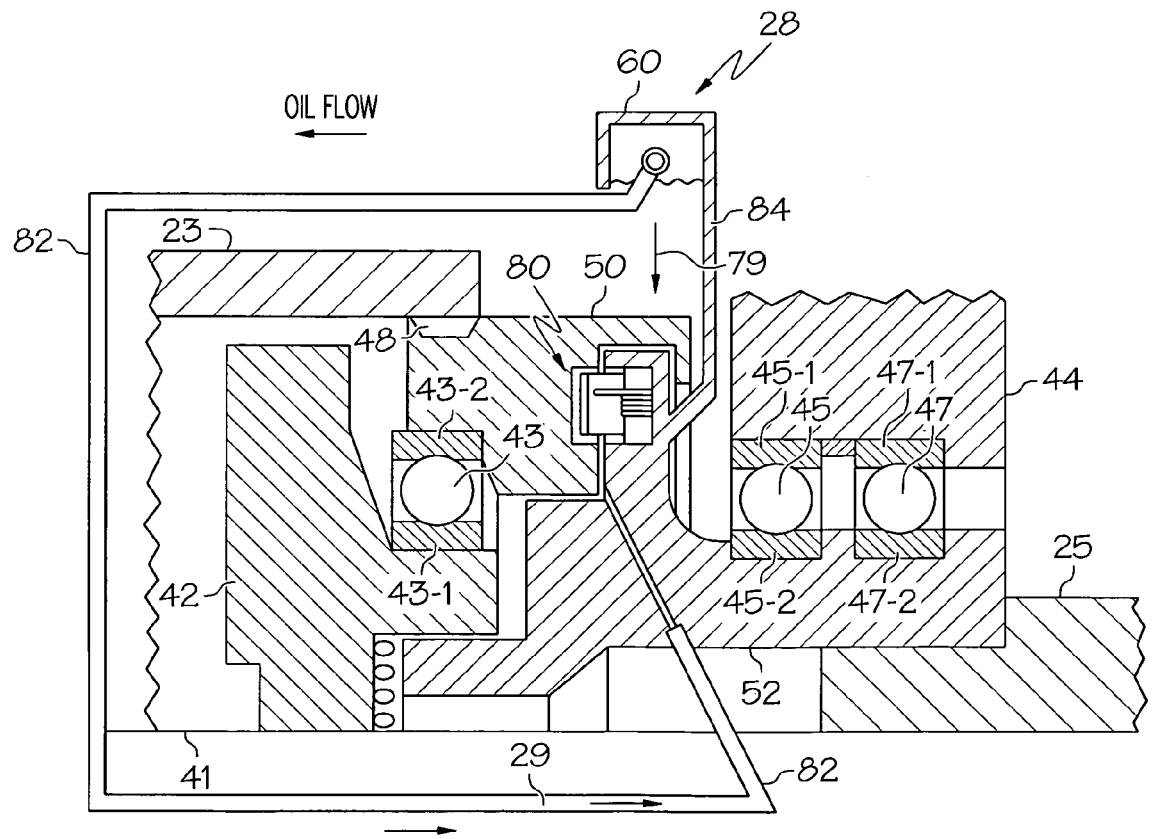
FIG. 2 is a simplified partial cross-sectional view through a portion of the assembly of FIG. 1, showing further details.

FIG. 2 is a simplified partial cross-section view through a particular physical implementation of a portion 40 of assembly 20 of FIG. 1, showing more detailed, physical implementations of clutch assembly 24 and pitot pump 28. In FIG. 2, only half the structure is shown, it being substantially rotationally symmetric about centerline and axis of rotation 41. For convenience of description, the exterior housing around clutch assembly 24 and pitot pump 28 is not shown so that attention can be focused on the interior operating elements of portion 40.

With the above background in mind, it is seen that portion 40 includes a substantially stationary frame member (stator) 42 that conveniently supports an inner race 43-1 and a bearing 43. Portion 40 further includes a substantially stationary frame member (stator) 44 that conveniently supports a plurality of outer races 45-1, 47-1 of a plurality of bearings 45, 47. While three bearings 43, 45, 47 are preferred, they are not essential. Bearing 43 coupling stator portion 42 and driving member 50 may be omitted. Driving member 50 is conveniently coupled via connection 23, to the air turbine starter motor 22 via a spline or other attachment means 48. Thus, connection 23 can also be used to support driving member 50, but this is not essential. Similarly, while two bearings 45, 47 are desirably used to couple the stator 44 and a driven member 52, this is not essential since the driven member 52 can be supported by the torque transfer connection 25. However, at least one of the bearings 43, 45, 47 is convenient, two of the bearings 43, 45, 47 are desirable, and the three bearings 43, 45, 47 are preferred. For example, having at least two bearings 45, 47 coupling stator 44 and driven member 52 is desirable, since a double suspension reduces or eliminates radial whip in driven member 52 independent of connection 25. This is especially desirable after engine start when driven member 52 is driven at high rotational speed by the torque transfer connection 25.

Bearing 43 has outer race 43-2 supporting the driving member 50 and the bearings 45, 47 have inner races 45-2 and 47-2 supporting the driven member 52. Driven member 52 is coupled to torque transfer connection 25 between the aircraft engine 26 and the clutch assembly 24. Any convenient coupling means may be used and a spline, a rotating flex joint, a rigid mount, a vibration damper, or a combination thereof are non-limiting examples of suitable connections, depending upon the needs of the user and the type of aircraft engine 26 coupled to the torque transfer connection 25. Persons of skill in the art will understand that a speed changing gearbox and other equipment (not shown) may be associated with the aircraft engine 26, and for the purposes of this invention are assumed to be a part of the engine 26. While member 52 is referred to for convenience of explanation as a "driven" member, persons of skill in the art will understand based on the explanation given herein that this status preferably occurs only during engine start when torque is being transmitted from the starter motor 22 through the clutch assembly 24 to the aircraft engine 26. Once start has occurred, and the clutch assembly 24 has disconnected the input connection 23 and the output torque transfer connection 25, then member 52 is being driven by the aircraft engine 26 through the torque transfer connection 25. However, for consistency and to more easily distinguish the various rotating parts, member 52 will continue to be referred to as a "driven" member unless specifically noted otherwise, even though it is a driving member in post-start operation.

Figure 3:
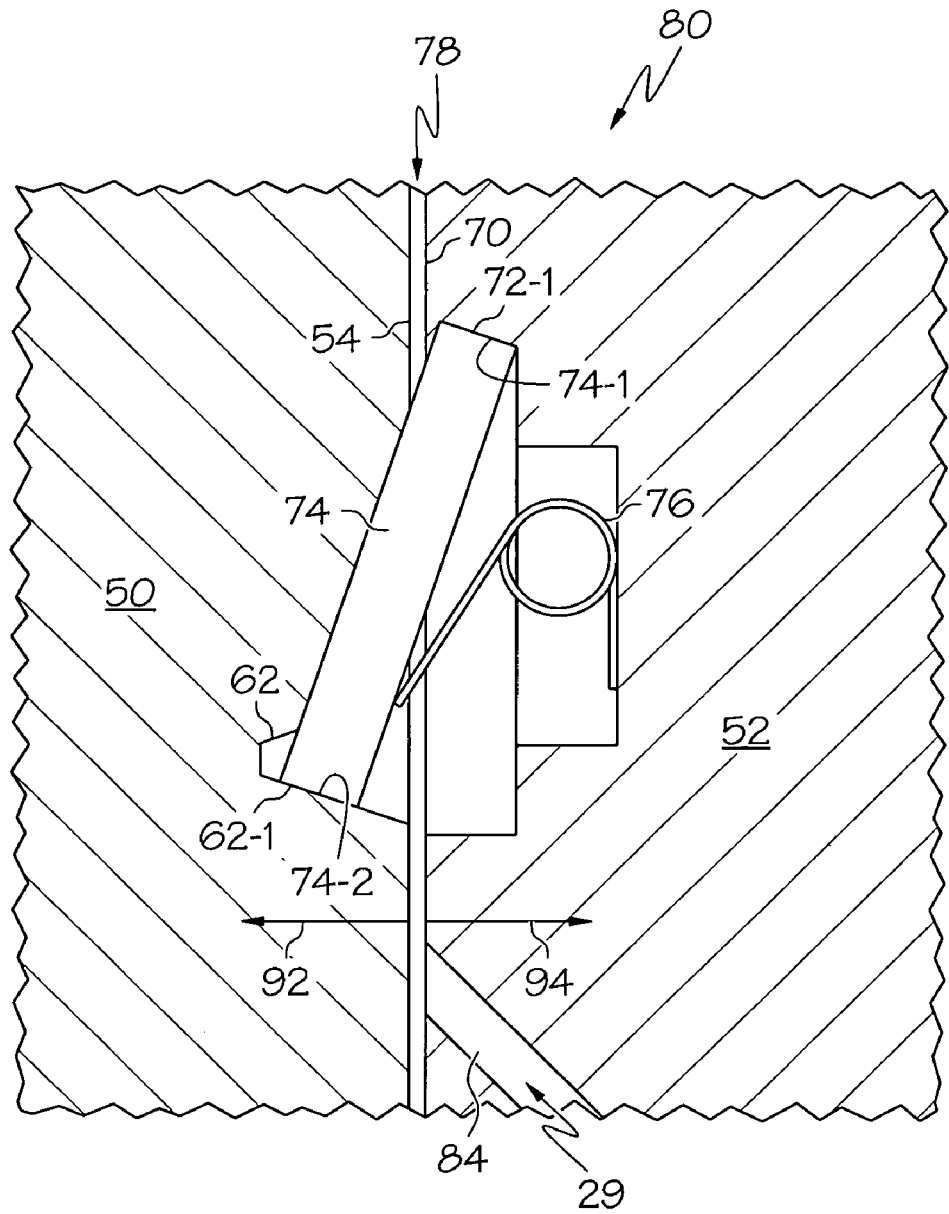
FIG. 3 is an enlarged cross-sectional view of a portion of the assembly of FIG. 2 showing still further details.

FIG. 3 is an enlarged cross-sectional view of a portion 80 of the portion 40 of FIG. 2, taken horizontally perpendicular to the plane of FIG. 2 looking in the direction of arrow 79 on FIG. 2, and showing still further details. Referring now to FIGS. 2 and 3 together, the driving member 50 has a face 54 that is conveniently, but not essentially, substantially perpendicular to the axis of rotation 41 of portion 40. Set into the face 54 are one or more notches 62. The driven member 52 has a face 70 that is conveniently, but not essentially, substantially perpendicular to the axis of rotation 41 of portion 40. Set into the face 70 are one or more pockets 72. Located in each of the pockets 72 is a moveable pawl or strut 74 having a first end 74-1 that mates with a first end 72-1 of the pocket 70 and a second distal end 74-2 that is urged outward from the face 70 by a spring 76 so as to engage the first end 62-1 of the notch 62 in the face 54 when member 50 is driving member 52, and retract into the pocket 72 when the clutch assembly 24 is in the over-run operation mode, that is, not driving member 52. Separating the faces 54 and 70 of the members 50 and 52 is an inter-plate space 78 filled with an oil 29 supplied by the pitot pump 28 via a channel 82. The oil 29 conveniently returns to the pitot pump 28 via a channel 84 and others (not shown) that separate and/or penetrate the members 42, 50, 52 but this is not essential. Any convenient means of returning the oil 29 to the pitot pump 28 may be used. The combination of the pocket 72, the strut or the pawl 74, the notch 62, the spring 76, the pitot pump 28 and the other elements described herein, provide one type of clutch for use in the starter assembly 20, commonly referred to as a planar ratcheting one way (PROW) clutch. Typically, a PROW clutch is utilized in that it is a quick engaging and releasing, low friction, one-way torque transfer mechanism. It should be understood that other more common types of clutches can be used in the starter assembly 20, and that a PROW clutch is merely shown for exemplary purposes.

When the driving member 50 begins to turn, as soon as one or more of the pawls or struts 74 in the pockets 72 engages one or more of the notches 62 in the face 54 of driving member 50, the pitot pump 28 supplies oil 29 to the inter-plate space 78 between the faces 54, 70 and the channels 85, 87, 89 to cushion the strut or pawl 74 as it rotates against the face 54 of the now stationary member 50. In the preferred embodiment, the faces 54, 70 are substantially perpendicular to the axis of rotation 41. However, this is convenient but not essential. Alternatively, the faces 54, 70 can be, for example and not intended to be limiting, cone shaped or cylindrically shaped, that is not substantially perpendicular to the axis of rotation 41 but forming a predetermined angle with the axis 41 or parallel to the axis 41. Either arrangement is useful. What is more important is that the faces 54, 70 be substantially parallel and comparatively closely spaced so that one or more of the struts 74 may bridge between the pockets 72 and the notches 62 and so that the struts 74 are retained in the pockets 72 in the over-run state. Thus, in the preferred embodiment, the inter-plate space 78 between the faces 54 and 70 is small and readily filled by the oil 29 which provides a lubricating film on which the struts 74 ride against the face 54 when the clutch assembly 24 is in the over-run state.

The foregoing description has been in terms of the driving member 50 having the notch plate face 54 and the driven member 52 having the pocket and strut plate face 70, but this is merely for convenience of explanation and not intended to be limiting. Persons of skill in the art will understand that the present invention works equally well when these roles are reversed, that is, when the face 70 with its associated pockets 72 and struts 74 is coupled to the driving member 50 in place of the face 54 and the face 54 with its associated pockets is coupled to the driven member 52 in place of the face 70, that is the notch and pocket plates faces are swapped. Stated another way, the notch plate 54 can be coupled to either the starter motor 22 or the aircraft engine 26 and the strut pocket plate 70 is then correspondingly coupled to the other of the starter motor 22 or the aircraft engine 26. Either arrangement is useful.

Figure 4:
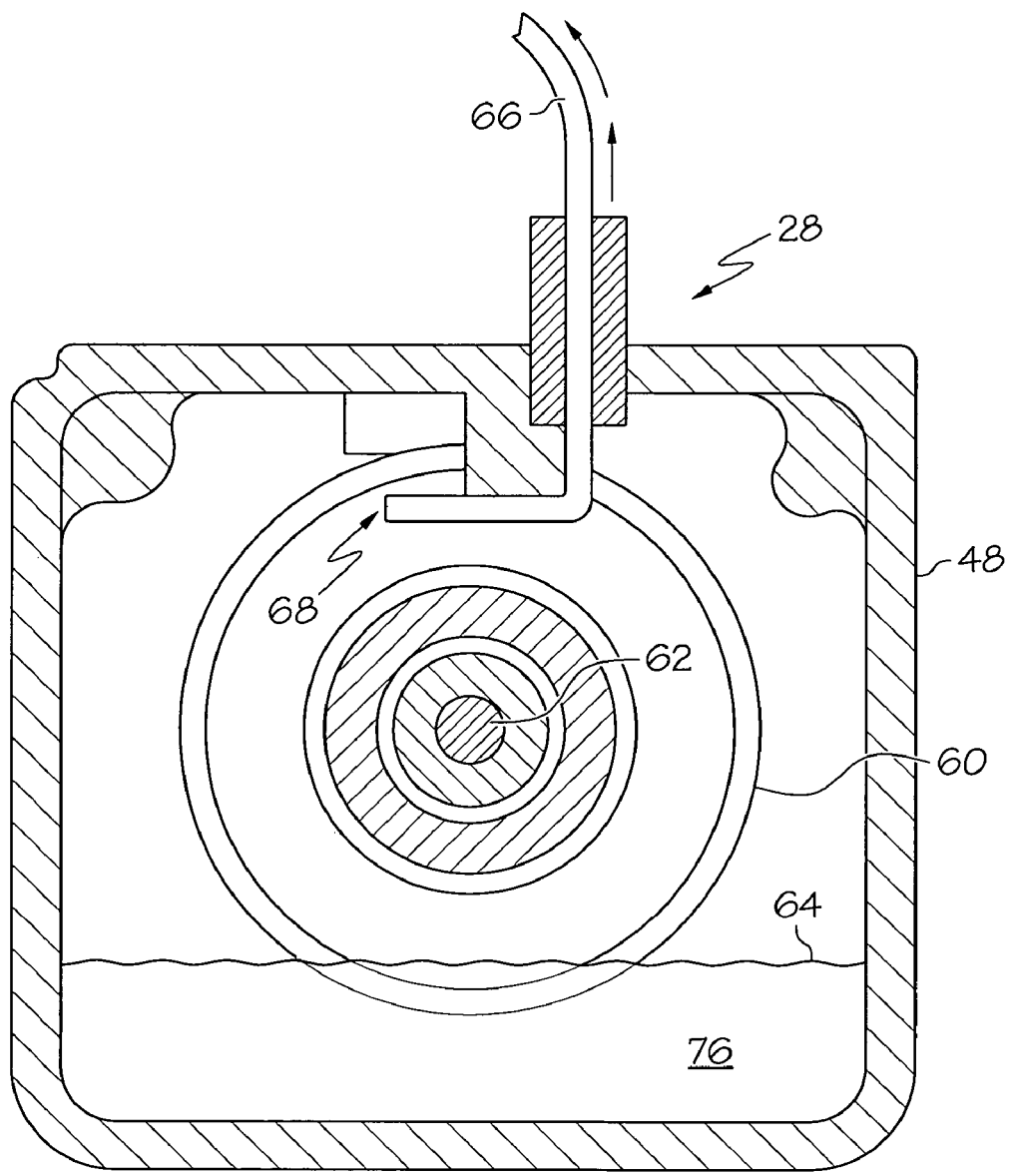
FIG. 4 is an enlarged cross-sectional view of yet another portion of the assembly of FIG. 2 showing still further details.

The inventive oil cooling system of the illustrated embodiment comprises the pitot pump 28 positioned in a trough as seen best in FIGS. 2 and 4. More specifically, pitot pump 28 is comprised of a trough, or annulus, 60 that is added to the overrunning section of the air turbine starter 20. The overrunning section maintains rotation when the main aircraft engine 26 is running. The trough 60 is positioned at least partially below an oil level 64 (see FIG. 4) of an oil reservoir 76, so that rotation of the trough 60 causes oil to travel toward pitot pump 28. The trough 60 is designed so that it dips into an oil reservoir 76 so that it is always full of oil. In this particular embodiment, the oil in oil reservoir 76 is contained by a structural member 78. Alternatively, the oil reservoir 76 may be contained within the trough 60.

The pitot pump 28 further comprises an elongated tube or conduit 66 which terminates in a tapered open end 68. The elongated tube or conduit 66 is positioned into the trough 60 so that the spinning oil impacts the tube 66. The tube 66 thus picks up the oil inside the rotating trough 60. More specifically, oil in the trough 60 enters the open end 68 and expands through the taper thereby forming a pressure differential which forces the oil to flow through the tube or conduit 66. The speed of the oil produces pressure going into the tube 66 and thus allows oil to flow through the tube 66 to the air turbine starter components that require lubricating oil while the engine is running. In FIG. 4, the trough is shown partially cut away to reveal the pitot tube 66.

The cooling system transfers the lubricating fluid, or oil, from conduit 66 of pitot pump 28 via the oil channel 82 (FIG. 2) to the overrunning section and any rotating components of starter 20, and more particularly to the clutch assembly 24. The oil channel 84 (FIG. 3) returns the oil from the overrunning section, and more particularly the clutch assembly 24, to the oil reservoir 76.

It will be apparent that the circulating oil, propelled by the action of pitot pump 28, removes heat from clutch assembly 24 as well as other rotating components within air turbine starter 20. It will be seen that the cooling system of the present invention may be configured as a closed loop system where oil in the oil reservoir 76 is recirculated to remove heat from the clutch assembly 34 while also providing lubrication to the gears in air turbine system 20. Thus, the present invention provides for the integration of a pitot pump as a lubricating means in an air turbine system which provides for an effective heat removal apparatus for sealed, high power engine components.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An aircraft engine starter having a centerline of rotation and comprising:
    a) a torque transfer connection adapted to be coupled to the aircraft engine;
    b) a starter motor;
    c) a clutch assembly coupled to one of the starter motor or the torque transfer connection, the clutch assembly formed a radial distance from the centerline of rotation, the clutch assembly comprising a notch plate rotationally coupled to one of the starter motor or the torque transfer connection, a strut pocket plate rotationally coupled to the other of the starter motor or the torque transfer connection, an inter-plate space defined between the notch plate and the strut pocket plate, at least one spring having first and second ends, the first end bearing against the strut pocket plate, and at least one strut having first and second ends, the first end bearing against the strut pocket plate and the second end free to move toward the notch plate;
    d) an oil reservoir formed within the aircraft engine starter and having an oil supply within, the oil reservoir formed a radial distance from the centerline greater than the radial distance of the clutch assembly from the centerline of rotation; and
    e) a pitot pump coupled to one or both of the notch plate or strut pocket plate and positioned within the oil reservoir, the pitot pump configured to deliver oil under pressure to the inter-plate space through one or more holes in either the strut pocket plate or the notch plate or both, the oil under pressure in the inter-plate space creating an axially directed force tending to separate the strut pocket plate and the notch plate.

2. The starter of claim 1, wherein said pitot pump comprises a pitot tube in fluidic communication with the oil reservoir.

3. The starter of claim 2, wherein said pitot tube is an elongated tube that terminates in a tapered open end.

4. The starter of claim 2, wherein said pitot pump further comprises a trough, wherein said trough is at least partially submerged in the oil reservoir for channeling oil to said pump via said pitot tube.

5. The starter of claim 2, wherein said pitot pump further comprises a trough having contained therein lubricating oil.

6. The starter of claim 2, wherein said pitot pump delivers oil under pressure to the clutch assembly via a channel in fluidic communication with the pitot tube and the clutch assembly.

7. The starter of claim 1, wherein the notch plate includes a first face with at least one notch therein, the strut pocket plate includes a second face substantially parallel to the first face and spaced apart therefrom by the inter-plate space, wherein the second face has at least one pocket therein facing toward the first face.

8. An aircraft engine starter, comprising:
    a torque transfer connection adapted to be coupled to the aircraft engine;
    a starter motor;
    a clutch assembly formed a radial distance from the centerline of rotation, the clutch assembly comprising a notch plate rotationally coupled to one of the starter motor or the torque transfer connection, a strut pocket plate rotationally coupled to the other of the starter motor or the torque transfer connection, at least one spring having first and second ends, the first end bearing against the strut pocket plate, and at least one strut having first and second ends, the first end bearing against the strut pocket plate and the second end free to move toward the notch plate;
    an oil reservoir formed within the aircraft engine starter and having an oil supply within, the oil reservoir formed a radial distance from the centerline greater than the radial distance of the clutch assembly from the centerline of rotation; and
    a pitot pump coupled to one or both of the notch plate or strut pocket plate and positioned within the oil reservoir, the pitot pump configured to deliver oil under pressure to the clutch assembly through one or more holes in either the strut pocket plate or the notch plate or both.

9. The starter of claim 8, wherein said pitot pump comprises an elongated pitot tube that terminates in a tapered open end, in fluidic communication with the oil reservoir.

10. The starter of claim 9, wherein said pitot pump further comprises a trough, wherein said trough is at least partially submerged in the oil reservoir for channeling oil to said pump via said pitot tube.

11. The starter of claim 9, wherein said pitot pump further comprises a trough, wherein oil is trapped in said trough.

12. The starter of claim 9, wherein said pitot pump delivers oil under pressure to the clutch assembly through one or more holes in the clutch assembly.

13. The starter of claim 8, wherein the notch plate includes a first face with at least one notch therein, the strut pocket plate includes a second face substantially parallel to the first face and spaced apart therefrom by an inter-plate space, wherein the second face has at least one pocket therein facing toward the first face.

14. The starter of claim 8, wherein the pitot pump is coupled to one or both of the notch plate or strut pocket plate and delivers oil under pressure to the inter-plate space through one or more holes in either the strut pocket plate or the notch plate or both, the oil under pressure in the inter-plate space creating an axially directed force tending to separate the strut pocket plate and the notch plate.

15. The starter of claim 8, further including a first support bearings having a first race coupled to the strut pocket plate and a second race coupled to a first stator and a second support bearing having a first race coupled to the notch plate and a second race coupled to a second stator for radially supporting the strut pocket plate with respect to the notch plate.

16. An aircraft engine starter, comprising:
a torque transfer connection adapted to be coupled to the aircraft engine;
a starter motor;
a clutch assembly formed a radial distance from the centerline of rotation, the clutch assembly comprising a notch plate rotationally coupled to one of the starter motor or the torque transfer connection, a strut pocket plate rotationally coupled to the other of the starter motor or the torque transfer connection, at least one spring having first and second ends, the first end bearing against the strut pocket plate, and at least one strut having first and second ends, the first end bearing against the strut pocket plate and the second end free to move toward the notch plate;
an oil reservoir formed within the aircraft engine starter and having an oil supply within, the oil reservoir formed a radial distance from the centerline greater than the radial distance of the clutch assembly from the centerline of rotation; and
a pitot pump coupled to one or both of the notch plate or strut pocket plate and positioned within the oil reservoir, the pitot pump configured to deliver oil under pressure to the clutch assembly, the pitot pump comprising an elongated pitot tube that terminates in a tapered end, in fluidic communication with the oil reservoir.

17. The starter of claim 16, wherein said pitot pump delivers oil under pressure to the clutch assembly through one or more holes in either the strut pocket plate or the notch plate or both.

18. The starter of claim 16, wherein said pitot pump delivers oil to the clutch assembly via a first oil line and oil is returned to the pitot pump via a second oil line.

* * * * *